United States Patent
Chen et al.

(10) Patent No.: US 11,918,892 B2
(45) Date of Patent: Mar. 5, 2024

(54) GAMING SYSTEM AND OPERATION METHOD OF GAMING SERVER THEREOF

(71) Applicant: Acer Incorporated, New Taipei (TW)

(72) Inventors: Kuan-Ju Chen, New Taipei (TW); Hung-Ming Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 32 days.

(21) Appl. No.: 17/739,206

(22) Filed: May 9, 2022

(65) Prior Publication Data

US 2022/0401831 A1    Dec. 22, 2022

(30) Foreign Application Priority Data

Jun. 17, 2021   (TW) .................................. 110122121

(51) Int. Cl.
*A63F 13/35* (2014.01)

(52) U.S. Cl.
CPC .................... *A63F 13/35* (2014.09)

(58) Field of Classification Search
CPC ....... A63F 13/35; A63F 13/358; A63F 13/822
See application file for complete search history.

(56) References Cited

U.S. PATENT DOCUMENTS

| | | | | |
|---|---|---|---|---|
| 2012/0051102 | A1* | 3/2012 | Wagoner | H02J 3/40 363/49 |
| 2012/0108320 | A1* | 5/2012 | Ye | A63F 13/87 463/43 |
| 2012/0309540 | A1* | 12/2012 | Holme | A63F 13/48 463/42 |

FOREIGN PATENT DOCUMENTS

| | | |
|---|---|---|
| TW | I477967 | 3/2015 |
| TW | 201539296 | 10/2015 |
| TW | I558146 | 11/2016 |

* cited by examiner

*Primary Examiner* — Ronald Laneau
(74) *Attorney, Agent, or Firm* — JCIPRNET

(57) ABSTRACT

A gaming system and an operation method of a gaming server thereof are provided. The gaming system includes multiple player devices and the gaming server. The gaming server establishes a network connection with the player devices. In response to one of the player devices initiating a game, the gaming server sends a game notification to the player devices according to a player list. The gaming server determines a common throughput between the player devices based on a response of each of the player devices to the game notification.

44 Claims, 5 Drawing Sheets

GAMING SYSTEM AND OPERATION METHOD OF GAMING SERVER THEREOF

CROSS-REFERENCE TO RELATED APPLICATION

This application claims the priority benefit of Taiwan application serial no. 110122121, filed on Jun. 17, 2021. The entirety of the above-mentioned patent application is hereby incorporated by reference herein and made a part of this specification.

BACKGROUND

Technical Field

The disclosure relates to a multi-machine interconnection gaming technology, and particularly relates to a gaming system and an operation method of a gaming server thereof.

Description of Related Art

A multiplayer online game is a game that allows multiple players (multiple player devices) to interact with each other within one virtual world at the same time. The player device may be a personal computer, a mobile phone, a tablet computer, a home game console, or other gaming platforms. Different player devices have different performances, and the difference in performances may affect a gaming experience. For example, different player devices have different transmission control protocol (TCP) throughputs. Due to the difference in the TCP throughputs, different player devices may wait for each other during the game, resulting in game lag and/or other phenomena.

SUMMARY

The disclosure is directed to a gaming system and an operation method of a gaming server thereof, which enable a plurality of player devices to play a same game together.

In an embodiment of the disclosure, the gaming system includes a plurality of player devices and a gaming server. The gaming server is configured to establish a network connection with the player devices. In response to one of the player devices initiating a game, the gaming server sends a game notification to the player devices according to a player list. The gaming server determines a common throughput between the player devices based on a response of each of the player devices to the game notification.

In an embodiment of the disclosure, the operation method of a gaming server includes the following. A network connection with a plurality of player devices is established by the gaming server. In response to one of the player devices initiating a game, a game notification is sent to the player devices by the gaming server according to a player list. A common throughput between the player devices is determined by the gaming server based on a response of each of the player devices to the game notification.

Based on the above description, the gaming server may send the same game notification to different player devices, and wait for responses from these player devices. The gaming server may determine the common throughput based on the responses of the player devices. Based on the common throughput, actual throughputs of these player devices may be unified as much as possible. During a process that multiple player devices run a same game together, the unified throughput may prevent these player devices from waiting for each other as much as possible.

In an embodiment of the disclosure, the gaming system includes a plurality of player devices and a gaming server. The gaming server is configured to establish a network connection with the player devices. The gaming server checks a current throughput of a connection device of a current player device in the player devices. The gaming server determines whether to perform a graphics processing unit (GPU) sharing with the current player device according to the current throughput of the current player device.

In an embodiment of the disclosure, the operation method of a gaming server includes the following. A network connection with a plurality of player devices is established by the gaming server. A current throughput of a connection device of a current player device in the player devices is checked by the gaming server. Whether to perform a graphics processing unit sharing with the current player device is determined by the gaming server according to the current throughput of the current player device.

Based on the above description, the gaming server may dynamically (adaptively) determine whether to share computing resources of the graphics processing unit of the gaming server with any of these player devices.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
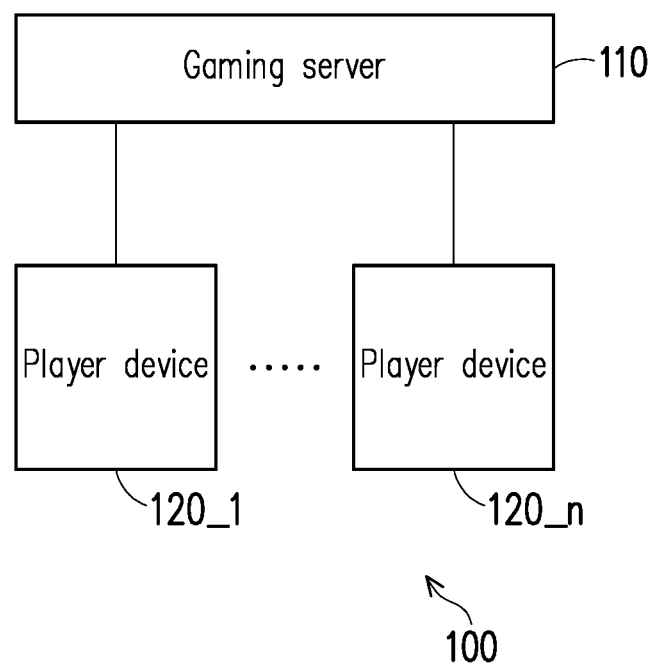
FIG. 1 is a schematic circuit block diagram of a gaming system according to an embodiment of the disclosure.

A term "couple (or connect)" used in the full text of the disclosure (including the claims) refers to any direct and indirect connections. For example, if a first device is described to be coupled (or connected) to a second device, it is interpreted as that the first device is directly coupled to the second device, or the first device is indirectly coupled to the second device through other devices or connection means. "First", "second", etc. mentioned in the specification and the claims are merely used to name discrete components and should not be regarded as limiting the upper or lower bound of the number of the components, nor is it used to define a manufacturing order or setting order of the components. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic circuit block diagram of a gaming system 100 according to an embodiment of the disclosure. The gaming system 100 includes a gaming server 110 and a plurality of player devices (for example, n player devices 120_1, . . . , 120_n shown in FIG. 1). The gaming server 110 may establish a network connection with the player devices 120_1 to 120_n. Any one of the player devices 120_1 to 120_n may initiate a game. Based on display sharing of the gaming server 110, the player devices 120_1 to 120_n may carry on multiplayer online games.

Figure 2:
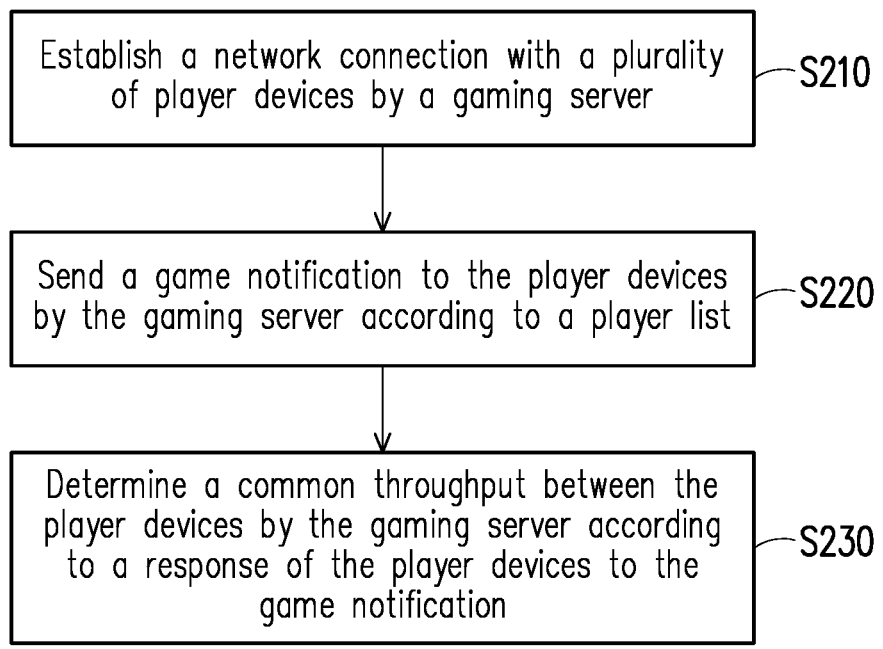
FIG. 2 is a schematic flowchart of an operation method of a gaming server according to an embodiment of the disclosure.

FIG. 2 is a schematic flowchart of an operation method of the gaming server 110 according to an embodiment of the disclosure. Referring to FIG. 1 and FIG. 2, in step S210, the gaming server 110 establishes a network connection with the player devices 120_1 to 120_n. When one of the player devices 120_1 to 120_n initiates a game, in step S220, the gaming server 110 sends a game notification to the player devices 120_1 to 120_n according to a player list. The player devices 120_1 to 120_n may receive the game notification and generate responses to the gaming server 110 in response to the game notification. In step S230, the gaming server 110 determines a common throughput between the player devices 120_1 to 120_n based on the responses of the player devices 120_1 to 120_n to the game notification. According to an actual design, in some embodiments, the common throughput may include a transmission control protocol (TCP) throughput and/or other throughputs.

For example, in some embodiments, the game notification includes a same welcome screen. The player devices 120_1 to 120_n may respectively receive the same welcome screen and generate a response to the gaming server 110 in response to the same welcome screen. After the gaming server 110 sends the same welcome screen to the player devices 120_1 to 120_n, the gaming server 110 may count a response time of any one of the player devices 120_1 to 120_n to the same welcome screen. The gaming server 110 may determine whether to send a "device upgrade notification" to a current player device based on a response time of the current player device (any one of the player devices 120_1 to 120_n) to inform a user of the current player device that the performance of such player device is not suitable for this game. For example, when the response time of one of invited player devices in the player devices 120_1 to 120_n is greater than a time threshold, the gaming server 110 may send the device upgrade notification to the invited player device. Where, the time threshold is any real number that may be determined according to an actual design requirement.

The embodiment does not limit the way of determining the common throughput of step S230. For example, in some embodiments, the gaming server 110 may send the game notification to the player devices 120_1 to 120_n in step S220 to inquire about a transmission memory size of any one of the player devices 120_1 to 120_n. According to an actual design, a transmission memory may be a memory allocated to a connection device (such as a network card or other devices), or a TCP memory, or other memories used for network data transmission. According to the transmission memory size of each of the player devices 120_1 to 120_n, the gaming server 110 may determine the common throughput suitable for the player devices 120_1 to 120_n. For example, in some embodiments, the gaming server 110 may determine the common throughput according to the smallest transmission memory size in the transmission memory sizes of the player devices 120_1 to 120_n. The gaming server 110 may notify the player devices 120_1 to 120_n such that any one of the player devices 120_1 to 120_n may set a rated throughput (for example, the TCP throughput) of its own connection device according to the common throughput.

Based on the above description, the gaming server 110 may send the same game notification to the different player devices 120_1 to 120_n, and wait for responses from the player devices 120_1 to 120_n. The gaming server 110 may determine the common throughput according to the responses of the player devices 120_1 to 120_n. Based on the common throughput, actual throughputs of the player devices 120_1 to 120_n may be unified as much as possible. During a process that multiple player devices 120_1 to 120_n run a same game together, the unified throughput may prevent these player devices 120_1 to 120_n from waiting for each other as much as possible.

Figure 3:
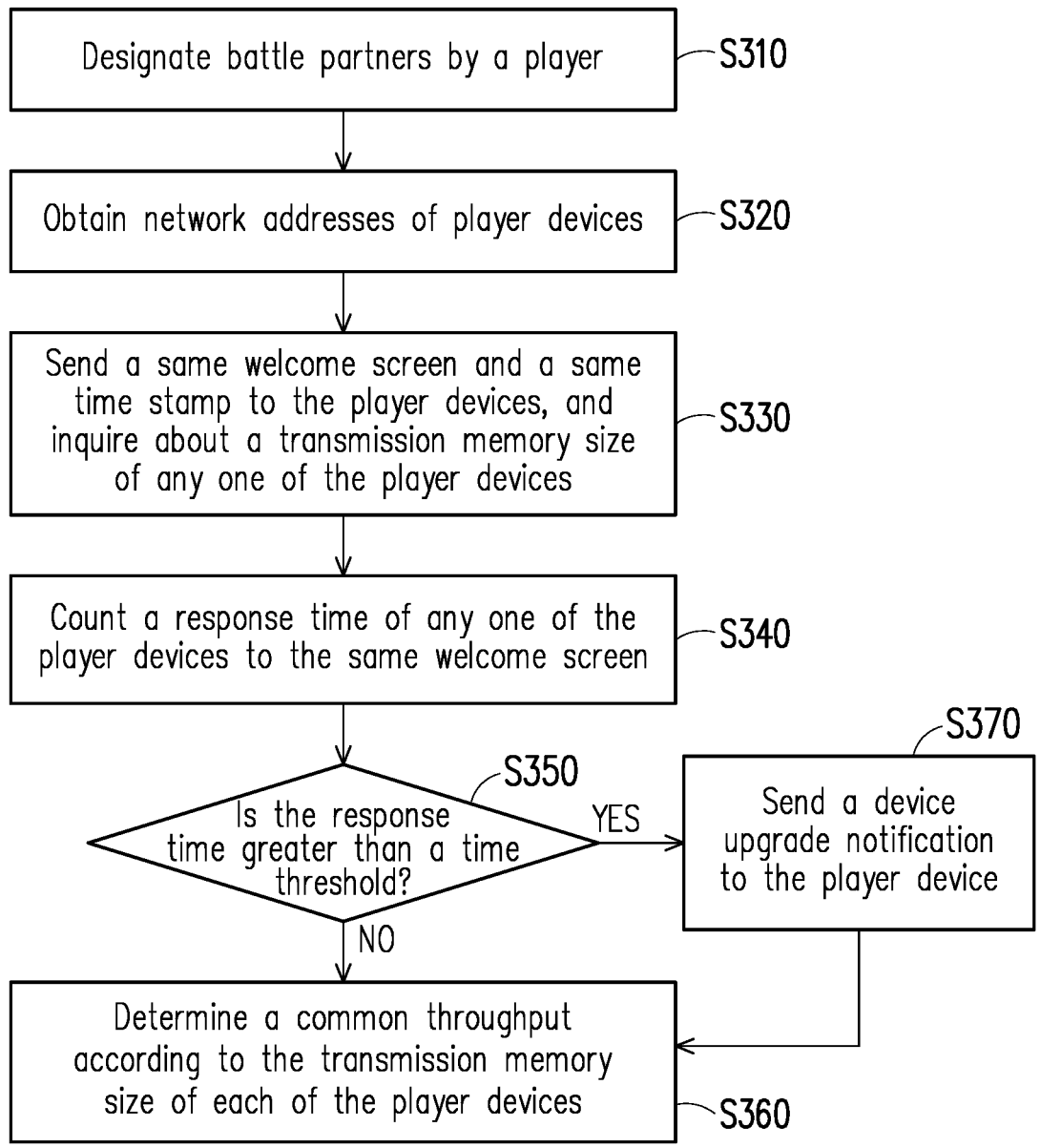
FIG. 3 is a schematic flowchart illustrating a game initialization process of a gaming server according to another embodiment of the disclosure.

FIG. 3 is a schematic flowchart illustrating a game initialization process of the gaming server 110 according to another embodiment of the disclosure. Referring to FIG. 1 and FIG. 3, in step S310, a player may designate battle partners (the player devices), and then determine the player list. It is assumed that the player list determined in step S310 includes the player devices 120_1 to 120_n. In step S320, the gaming server 110 may obtain network addresses of the player devices 120_1 to 120_n according to the player list. In step S330, the gaming server 110 may send a same welcome screen (game notification) and a same time stamp to the player devices 120_1 to 120_n, and inquire about a transmission memory size of any one of the player devices 120_1 to 120_n. According to an actual design, the transmission memory may be the memory allocated to the connection device, or the TCP memory, or other memories used for network data transmission.

The player devices 120_1 to 120_n may respectively receive the same welcome screen and generate a response to the gaming server 110 in response to the same welcome screen. In step S340, the gaming server 110 may count a response time of any one of the player devices 120_1 to 120_n to the same welcome screen. In step S350, the response time of any one of the player devices 120_1 to 120_n may be compared with a time threshold. Where, the time threshold may be any real number determined according to an actual design requirement.

For the convenience of description, one of the player devices 120_1 to 120_n is referred to as an invited player device, and the others of the player devices 120_1 to 120_n may be deduced by analogy by referring to the related description of the "invited player device". When the response time of the invited player device is not greater than the time threshold (a determination result of step S350 is "No"), the gaming server 110 executes step S360. In step S360, according to the transmission memory size of each of the player devices 120_1 to 120_n, the gaming server 110 may determine the common throughput suitable for the player devices 120_1 to 120_n. For example, the gaming server 110 may set the invited player device according to the smallest transmission memory size in the transmission memory sizes of the player devices 120_1 to 120_n.

When the response time of the invited player device is greater than the time threshold (the determination result of step S350 is "Yes"), the gaming server 110 executes step S370. In step S370, the gaming server 110 may send a device upgrade notification to the invited player device to inform the user of the invited player device that "the performance of the invited player device is not suitable for this game." After step S370 is ended, the gaming server 110 may execute step S360.

Figure 4:
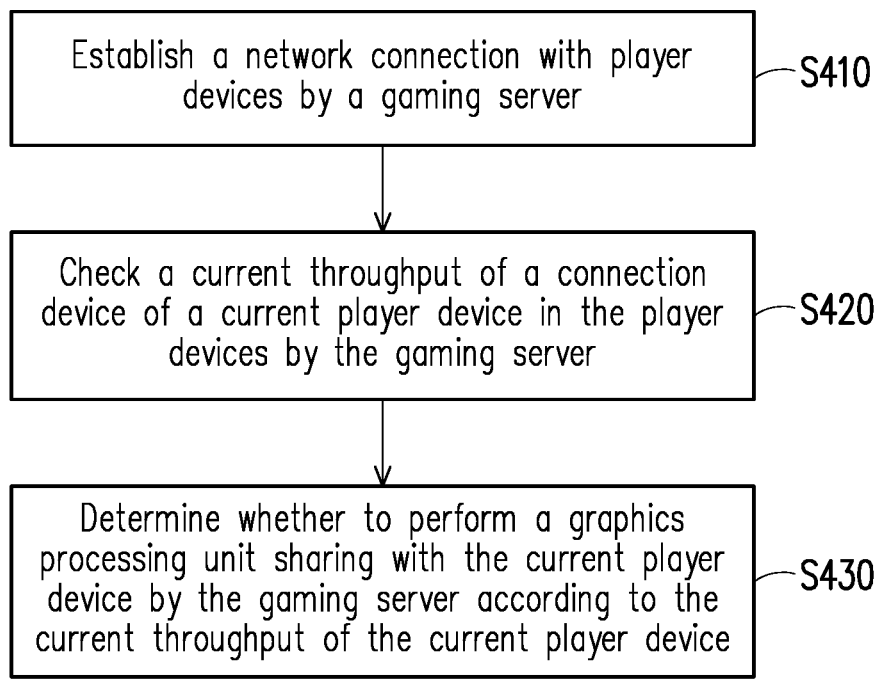
FIG. 4 is a schematic flowchart of an operation method of a gaming server according to another embodiment of the disclosure.

FIG. 4 is a schematic flowchart of an operation method of the gaming server 110 according to another embodiment of the disclosure. Referring to FIG. 1 and FIG. 4, in step S410, the gaming server 110 establishes a network connection with the player devices 120_1 to 120_n. Step S410 may be deduced by analogy with reference to related descriptions of steps S210, S220, and S230 shown in FIG. 2. In some embodiments, the game notification sent by the gaming server 110 in step S410 may include a same time stamp. The player devices 120_1 to 120_n may receive the game notification, and respectively generate a response to the gaming server 110 in response to the same time stamp. The gaming server 110 may check the response of any one of the player devices 120_1 to 120_n to the same time stamp, and determine whether the any one of the player devices 120_1 to 120_n is a legal player device based on the responses.

In step S420, the gaming server 110 may check a current throughput of a connection device of a current player device in the player devices 120_1 to 120_n. In step S430, the gaming server 110 may determine whether to perform a graphics processing unit (GPU) sharing with the current player device according to the current throughput of the current player device. In some embodiments, the GPU sharing may include: according to tungsten graphics shader infrastructure (TGSI) information of the current player device (one of the player devices 120_1 to 120_n), the graphics processing unit (GPU, not shown in FIG. 1) of the gaming server 110 may draw a current graphic (an image frame), and send the current graphic back to the current player device. In addition to the current player device, the gaming server 110 may also broadcast the current graphic to other player devices in the player devices 120_1 to 120_n to carry on a multiplayer online game.

When the gaming server 110 determines to cancel the GPU sharing with the current player device (one of the player devices 120_1 to 120_n) in step S430, the gaming server 110 may set the current player device to a streaming mode. In the streaming mode, the current player device cannot use GPU computing resources of the gaming server 110 to reduce a workload of key components (such as a central processing unit, a memory and/or a storage device) of the current player device. Therefore, the current graphic (current image frame) is drawn by the GPU of the current player device. In addition to providing the current graphic for the display of the current player device, the current player device in the streaming mode further transmits the current graphic to the gaming server 110. The gaming server 110 may broadcast the current graphic drawn by the current player device to other player devices in the player devices 120_1 to 120_n to carry on the multiplayer online game.

The embodiment does not limit a decision mechanism of the gaming server 110 in step S430. According to an actual design, in some embodiments, the gaming server 110 may calculate an average value of the current throughputs (for example, the current TCP throughputs) of the player devices 120_1 to 120_n, and the gaming server 110 may compare the current throughput of the current player device (one of the player devices 120_1 to 120_n) with the average value, and determine whether to perform the GPU sharing with the current player device according to the comparison result. For example, when the current throughput (for example, the current TCP throughput) of the current player device is lower than the average value, the gaming server 10 may check whether the key components (such as the central processing unit, memory and/or storage device) of the current player device are fully loaded, and determine whether to perform the GPU sharing with the current player device based on a check result.

Figure 5:
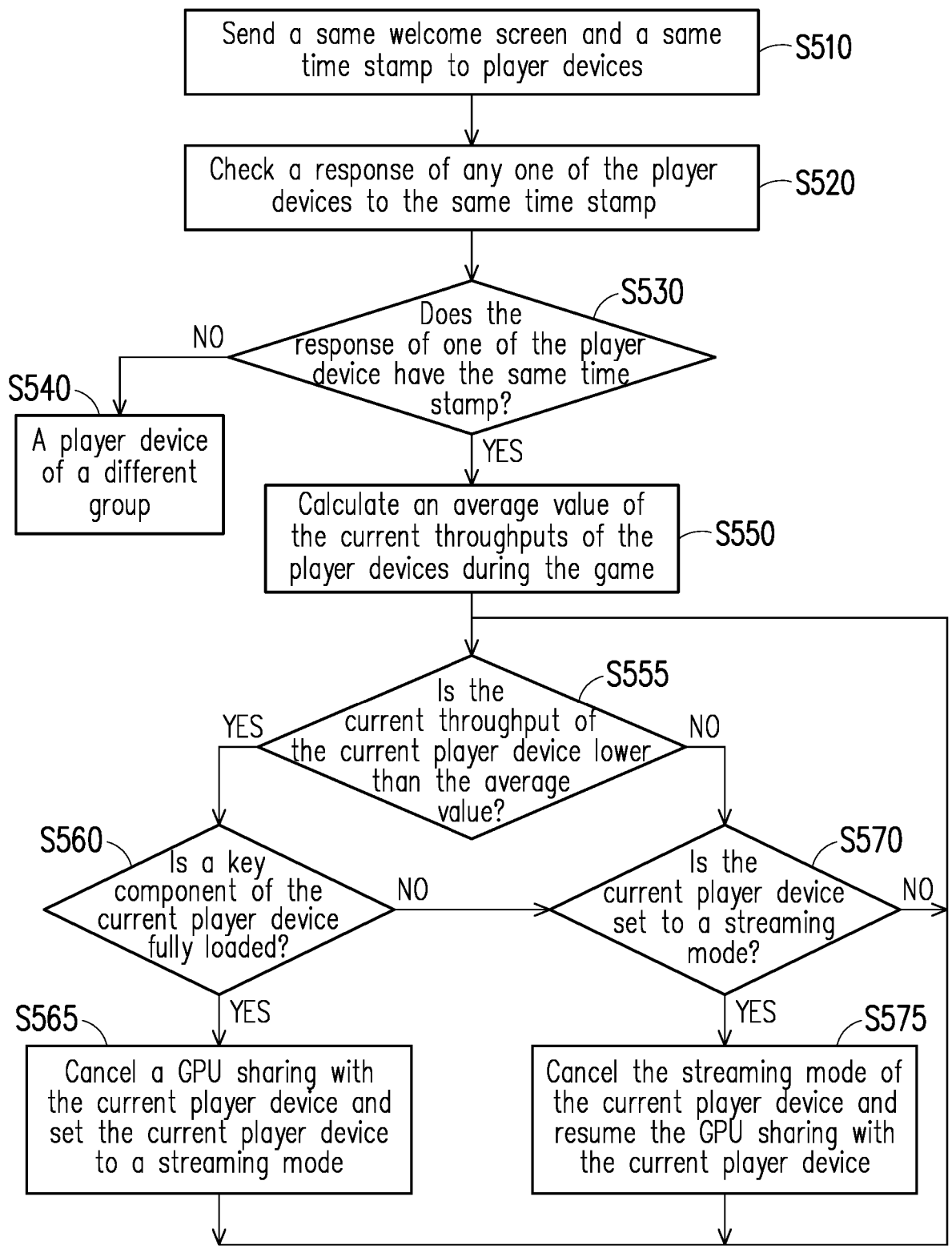
FIG. 5 is a schematic flowchart illustrating a dynamic GPU sharing of a gaming server according to another embodiment of the disclosure.

FIG. 5 is a schematic flowchart illustrating a dynamic GPU sharing of the gaming server 110 according to another embodiment of the disclosure. Referring to FIG. 1 and FIG. 5, in step S510, the gaming server 110 may send a same welcome screen (game notification) and a same time stamp to the player devices 120_1 to 120_n. Step S510 shown in FIG. 5 may be deduced by analogy with reference to the related description of step S330 shown in FIG. 3, and detail thereof is not repeated. The player devices 120_1 to 120_n may receive the same welcome screen and respectively generate a response to the gaming server 110 in response to the same time stamp. In step S520, the gaming server 110 may check the response of any one of the player devices 120_1 to 120_n to the same time stamp. When the response of one of the player devices 120_1 to 120_n (the current player device) does not have the same time stamp (a determination result of step S530 is "None"), the gaming server 110 may determine that the current player device is a player device of a different group, or determine that the current player device is not a legal player device (step S540).

When the response of one of the player devices 120_1 to 120_n (the current player device) has the same time stamp (the determination result of step S530 is "Yes"), the gaming server 110 may determine that the current player device is a legal player device and execute step S550. In step S550, the gaming server 110 may calculate an average value of the current throughputs (for example, the current TCP throughputs) of the player devices 120_1 to 120_n during the game, and the gaming server 110 may compare the current throughput of the current player device (any one of the player devices 120_1 to 120_n) with the average value. When the current throughput of the current player device is lower than the average value (a determination result of step S555 is "Yes"), the gaming server 110 may execute step S560. When the current throughput of the current player device is not lower than the average value (the determination result of step S555 is "No"), the gaming server 110 may execute step S570.

In step S560, the gaming server 110 may check whether the key components of the current player device are fully loaded. For example, the gaming server 110 may check whether any one of a central processing unit, a memory, and a storage device of the current player device is fully loaded. When the key components of the current player device are fully loaded (a determination result of step S560 is "Yes"), the gaming server 110 may perform step S565 to reduce the workload of the key components of the current player device. In step S565, the gaming server 110 may cancel the GPU sharing with the current player device and set the current player device to a streaming mode. The streaming mode and the GPU sharing have been explained in detail in related description of step S430, such that details thereof are not repeated. After completing step S565, the gaming server 110 may return to step S555. When all of the key components of the current player device are not fully loaded (the determination result of step S560 is "No"), the gaming server 110 may execute step S570.

In step S570, the gaming server 110 may check whether the current player device is set to a streaming mode. When a current operation mode of the current player device is not set to the streaming mode (a determination result of step S570 is "No"), the gaming server 110 may return to step S555. When the current operation mode of the current player device is set to the streaming mode (the determination result of step S570 is "Yes"), the gaming server 110 may execute step S575. In step S575, the gaming server 110 may cancel the streaming mode of the current player device and resume GPU sharing with the current player device. Namely, the current player device may again use the GPU computing resources of the gaming server 110.

Based on the above description, the gaming server 110 may dynamically (adaptively) determine whether to share the computing resources of the GPU of the gaming server 110 to any one of the player devices 120_1 to 120_n. Any one of the player devices 120_1 to 120_n (for example, the current player device) increases the workload of the key components due to running the GPU sharing. When the current throughput of the current player device is lower than the average value and a workload of any key component of the current player device is fully loaded, the gaming server 110 may dynamically (adaptively) determine to cancel the GPU sharing with the current player device to reduce the workload of the key component of the current player device. In some actual designs, the "the workload of the key component is fully loaded" may be interpreted as "equipment utilization rate reaches 100%". After the situation is relieved (the current throughput of the current player device is not lower than the average value, or the workload of all of the key components of the current player device is not fully loaded), the gaming server 110 may dynamically (adaptively) decided to resume the GPU sharing with the current player device.

There are still many games that still rely on the central processing unit (CPU) for rendering computations. In order to reduce a load of the CPU, a current redirection technology may be implemented through hardware. Therefore, programs belonging to an application layer and an operating system (OS) kernel layer are stored in a same memory block, which is then switched through hardware redirection technology. Different to a conventional method, the conventional method needs to send an interrupt through the CPU, and then perform transmission and duplication. In client devices (such as the player devices 120_1 to 120_n), a virtual memory is separated between the application layer and the kernel layer. Programs belonging to the application layer and the kernel layer, such as game applications, GPU devices, graphic drivers, and sockets, may be stored in a same block of the virtual memory. When the user opens the game, the game application and physical memory are mapped. When GPU computing is required or transmission through a socket is required, the address is transferred to the GPU and the graphics driver, and the address of the socket is mapped to the physical memory through hardware. A framework of the redirection technology of a server device (for example, the gaming server 110) is similar to that of the client device. In the server device, the virtual memory stores display sharing modules, the GPU devices, the graphics drivers, and the sockets. When a module is needed to perform calculation, the address is redirected to a belonging address through the hardware redirection technology, and then mapped with the physical memory.

According to different design requirements, the gaming server 110 and/or player devices 120_1 to 120_n may be implemented in hardware, firmware, software (i.e., program) or a combination thereof.

In terms of hardware, the gaming server 110 and/or the player devices 120_1 to 120_n may be implemented by logic circuits on an integrated circuit. Related functions of the gaming server 110 and/or the player devices 120_1 to 120_n may be implemented as hardware by using hardware description languages (for example, Verilog HDL or VHDL) or other suitable programming languages. For example, the related functions of the gaming server 110 and/or the player devices 120_1 to 120_n may be implemented by one or more controllers, microcontrollers, microprocessors, application-specific integrated circuits (ASIC), digital signal processors (DSP), field programmable gate arrays (FPGA) and/or various logic blocks, modules and circuits in other processing units.

In terms of software and/or firmware, the related functions of the gaming server 110 and/or the player devices 120_1 to 120_n may be implemented as programming codes. For example, general programming languages (such as C, C++ or assembly languages) or other suitable programming languages are used to implement the gaming server 110 and/or the player devices 120_1 to 120_n. The programming code may be recorded/stored in a "non-transitory computer readable medium". In some embodiments, the non-transitory computer readable medium includes, for example, a read only memory (ROM), a tape, a disk, a card, a semiconductor memory, and a programmable logic circuit and/or a storage device. The storage device includes a hard disk drive (HDD), a solid-state drive (SSD) or other storage devices. A computer, a CPU, a controller, a microcontroller, or a microprocessor may read and execute the programming codes from the non-transitory computer readable medium, thereby realizing the related functions of the gaming server 110 and/or player devices 120_1 to 120_n. Moreover, the programming codes may also be provided to the computer (or CPU) via any transmission medium (a communication network or a broadcast wave, etc.). The communication network is, for example, the Internet, a wired communication network, a wireless communication network, or other communication media.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A gaming system, comprising:
a plurality of player devices; and
a gaming server, configured to establish a network connection with the player devices, wherein
in response to one of the player devices initiating a game, the gaming server sends a game notification to the player devices according to a player list, and the gaming server determines a common throughput between the player devices based on a response of each of the player devices to the game notification.

2. The gaming system as claimed in claim 1, wherein the game notification comprises a same welcome screen, the gaming server counts a response time of any one of the player devices to the same welcome screen, and the gaming server determines whether to send a device upgrade notification to the any one of the player devices according to the response time.

3. The gaming system as claimed in claim 2, wherein in response to the response time of an invited player device in the player devices being greater than a time threshold, the gaming server sends the device upgrade notification to the invited player device.

4. The gaming system as claimed in claim 1, wherein the common throughput comprises a transmission control protocol throughput.

5. The gaming system as claimed in claim 1, wherein the gaming server sends the game notification to the player devices to inquire about a transmission memory size of any one of the player devices, and the gaming server determines the common throughput according to the transmission memory sizes of the player devices.

6. The gaming system as claimed in claim 5, wherein the gaming server determines the common throughput according to a smallest transmission memory size in the transmission memory sizes of the player devices.

7. The gaming system as claimed in claim 1, wherein the gaming server notifies the player devices such that any one of the player devices sets a rated throughput of a connection device of the any one of the player devices based on the common throughput.

8. The gaming system as claimed in claim 1, wherein the game notification comprises a same time stamp, the gaming server checks a response of any one of the player devices to the same time stamp, and the gaming server determines whether the any one of the player devices is a legal player device according to the response.

9. The gaming system as claimed in claim 1, wherein the gaming server checks a current throughput of a connection device of a current player device in the player devices, and the gaming server determines whether to perform a graphics processing unit sharing with the current player device according to the current throughput of the current player device.

10. The gaming system as claimed in claim 9, wherein the graphics processing unit sharing comprises:
drawing a current graphic by a graphics processing unit of the gaming server according to tungsten graphics shader infrastructure information of the current player device, and sending the current graphic back to the current player device.

11. The gaming system as claimed in claim 10, wherein the gaming server further broadcasts the current graphic to other player devices in addition to the current player device in the player devices.

12. The gaming system as claimed in claim 9, wherein in response to the gaming server determining to cancel the graphics processing unit sharing with the current player device, the gaming server sets the current player device to a streaming mode,
wherein in the streaming mode, a graphics processing unit of the current player device draws a current graphic, and the gaming server broadcasts the current graphic drawn by the current player device to other player devices in the player devices.

13. The gaming system as claimed in claim 9, wherein the gaming server calculates an average value of the current throughputs of the player devices, and the gaming server compares the current throughput of the current player device with the average value to determine whether to perform the graphics processing unit sharing with the current player device.

14. The gaming system as claimed in claim 13, wherein in response to the current throughput of the current player device being lower than the average value, the gaming server checks whether a key component of the current player device is fully loaded to determine whether to perform the graphics processing unit sharing with the current player device.

15. The gaming system as claimed in claim 14, wherein the key component comprises a central processing unit, a memory, or a storage device.

16. An operation method of a gaming server, comprising:
establishing a network connection with a plurality of player devices by the gaming server;
in response to one of the player devices initiating a game, sending a game notification to the player devices by the gaming server according to a player list; and
determining a common throughput between the player devices by the gaming server based on a response of each of the player devices to the game notification.

17. The operation method as claimed in claim 16, wherein the game notification comprises a same welcome screen, and the operation method further comprises:
counting a response time of any one of the player devices to the same welcome screen; and
determining whether to send a device upgrade notification to the any one of the player devices according to the response time by the gaming server.

18. The operation method as claimed in claim 17, further comprising:
in response to the response time of an invited player device in the player devices being greater than a time threshold, sending the device upgrade notification to the invited player device by the gaming server.

19. The operation method as claimed in claim 16, wherein the common throughput comprises a transmission control protocol throughput.

20. The operation method as claimed in claim 16, further comprising:
sending the game notification to the player devices by the gaming server to inquire about a transmission memory size of any one of the player devices; and
determining the common throughput according to the transmission memory sizes of the player devices by the gaming server.

21. The operation method as claimed in claim 20, further comprising:
determining the common throughput by the gaming server according to a smallest transmission memory size in the transmission memory sizes of the player devices.

22. The operation method as claimed in claim 16, further comprising:
notifying the player devices by the gaming server such that any one of the player devices sets a rated throughput of a connection device of the any one of the player devices based on the common throughput.

23. The operation method as claimed in claim 16, wherein the game notification comprises a same time stamp, and the operation method further comprises:
checking a response of any one of the player devices to the same time stamp by the gaming server; and
determining whether the any one of the player devices is a legal player device according to the response by the gaming server.

24. The operation method as claimed in claim 16, further comprising:
checking a current throughput of a connection device of a current player device in the player devices by the gaming server; and
determining whether to perform a graphics processing unit sharing with the current player device by the gaming server according to the current throughput of the current player device.

25. The operation method as claimed in claim 24, wherein the graphics processing unit sharing comprises:

drawing a current graphic by a graphics processing unit of the gaming server according to tungsten graphics shader infrastructure information of the current player device; and sending the current graphic back to the current player device.

26. The operation method as claimed in claim 25, further comprising:

further broadcasting the current graphic to other player devices in addition to the current player device in the player devices by the gaming server.

27. The operation method as claimed in claim 24, further comprising:

in response to the gaming server determining to cancel the graphics processing unit sharing with the current player device, setting the current player device to a streaming mode by the gaming server;

wherein in the streaming mode, a graphics processing unit of the current player device draws a current graphic, and the gaming server broadcasts the current graphic drawn by the current player device to other player devices in the player devices.

28. The operation method as claimed in claim 24, further comprising:

calculating an average value of the current throughputs of the player devices by the gaming server; and comparing the current throughput of the current player device with the average value by the gaming server to determine whether to perform the graphics processing unit sharing with the current player device.

29. The operation method as claimed in claim 28, further comprising:

in response to the current throughput of the current player device being lower than the average value, checking whether a key component of the current player device is fully loaded by the gaming server to determine whether to perform the graphics processing unit sharing with the current player device.

30. The operation method as claimed in claim 29, wherein the key component comprises a central processing unit, a memory, or a storage device.

31. A gaming system, comprising:

a plurality of player devices; and a gaming server, configured to establish a network connection with the player devices, wherein the gaming server checks a current throughput of a connection device of a current player device in the player devices, and the gaming server determines whether to perform a graphics processing unit sharing with the current player device according to the current throughput of the current player device.

32. The gaming system as claimed in claim 31, wherein the graphics processing unit sharing comprises:

drawing a current graphic by a graphics processing unit of the gaming server according to tungsten graphics shader infrastructure information of the current player device, and sending the current graphic back to the current player device.

33. The gaming system as claimed in claim 32, wherein the gaming server further broadcasts the current graphic to other player devices in addition to the current player device in the player devices.

34. The gaming system as claimed in claim 31, wherein in response to the gaming server determining to cancel the graphics processing unit sharing with the current player device, the gaming server sets the current player device to a streaming mode, wherein in the streaming mode, a graphics processing unit of the current player device draws a current graphic, and the gaming server broadcasts the current graphic drawn by the current player device to other player devices in the player devices.

35. The gaming system as claimed in claim 31, wherein the gaming server calculates an average value of the current throughputs of the player devices, and the gaming server compares the current throughput of the current player device with the average value to determine whether to perform the graphics processing unit sharing with the current player device.

36. The gaming system as claimed in claim 35, wherein in response to the current throughput of the current player device being lower than the average value, the gaming server checks whether a key component of the current player device is fully loaded to determine whether to perform the graphics processing unit sharing with the current player device.

37. The gaming system as claimed in claim 36, wherein the key component comprises a central processing unit, a memory, or a storage device.

38. An operation method of a gaming server, comprising:

establishing a network connection with the player devices by the gaming server;

checking a current throughput of a connection device of a current player device in the player devices by the gaming server; and determining whether to perform a graphics processing unit sharing with the current player device by the gaming server according to the current throughput of the current player device.

39. The operation method as claimed in claim 38, wherein the graphics processing unit sharing comprises:

drawing a current graphic by a graphics processing unit of the gaming server according to tungsten graphics shader infrastructure information of the current player device; and sending the current graphic back to the current player device.

40. The operation method as claimed in claim 39, further comprising:

further broadcasting the current graphic to other player devices in addition to the current player device in the player devices by the gaming server.

41. The operation method as claimed in claim 38, further comprising:

in response to the gaming server determining to cancel the graphics processing unit sharing with the current player device, setting the current player device to a streaming mode by the gaming server;

wherein in the streaming mode, a graphics processing unit of the current player device draws a current graphic, and the gaming server broadcasts the current graphic drawn by the current player device to other player devices in the player devices.

42. The operation method as claimed in claim 38, further comprising:

calculating an average value of the current throughputs of the player devices by the gaming server; and comparing the current throughput of the current player device with the average value by the gaming server to determine whether to perform the graphics processing unit sharing with the current player device.

43. The operation method as claimed in claim 42, further comprising:

in response to the current throughput of the current player device being lower than the average value, checking whether a key component of the current player device is fully loaded by the gaming server to determine whether to perform the graphics processing unit sharing with the current player device.

44. The operation method as claimed in claim 43, wherein the key component comprises a central processing unit, a memory, or a storage device.

* * * * *